United States Patent [19]

Beijer

[11] 4,413,294
[45] Nov. 1, 1983

[54] MECHANISM FOR CONTROLLING THE DISPLACEMENT OF A POSITIONER CONE RELATIVE TO A FLOPPY DISC

[75] Inventor: Gene Beijer, Los Angeles, Calif.

[73] Assignee: Magnum Division of Tandon Corporation, Chatsworth, Calif.

[21] Appl. No.: 259,914

[22] Filed: May 4, 1981

[51] Int. Cl.³ .................. G11B 5/016; G11B 17/02; G11B 25/04
[52] U.S. Cl. .................................. 360/99; 360/97
[58] Field of Search .................. 360/99, 97, 135, 133

[56] References Cited

U.S. PATENT DOCUMENTS

| 3,940,793 | 2/1976 | Bleiman | 360/99 |
| 4,040,106 | 8/1977 | Medley | 360/99 |
| 4,125,883 | 11/1978 | Rolph | 360/99 |
| 4,171,531 | 10/1979 | Grapes et al. | 360/97 |
| 4,177,491 | 12/1979 | Jann | 360/99 |
| 4,216,510 | 8/1980 | Manzke et al. | 360/99 |

FOREIGN PATENT DOCUMENTS 2081487 2/1982 United Kingdom ............... 360/133

OTHER PUBLICATIONS

IBM TDB, J. J. Holecek et al., Loading Collet for Flexible Magnetic Disks, vol. 21, No. 1, Jun. 1978, pp. 291-292.

Primary Examiner—Alfred H. Eddleman
Attorney, Agent, or Firm—Fraser and Bogucki

[57] ABSTRACT

A positioning system for floppy disc recording media utilizes a tapered positioner cone mounted on a gimballed structure at the free end of a pivotable support assembly. Straight line, non-tilted entry of the cone into the disc aperture is provided in combination with the gimbal mounting by positive guiding of the axis and attitude of the cone in the entry region. The mechanism for supporting the cone comprises a pivotted assembly incorporating a movable position control with an overtravel guide surface. Movement of a control element first causes pivotting of the assembly to lower the positioner cone relative to the floppy disc. Upon engagement, however, the guide surface and pivot relationship are such that further movement of the control element compresses the positioner cone under a spring force, utilized that the clamping force is controlled and the clamping action is stable until the control element is shifted to release the positioner cone from the floppy disc.

15 Claims, 8 Drawing Figures

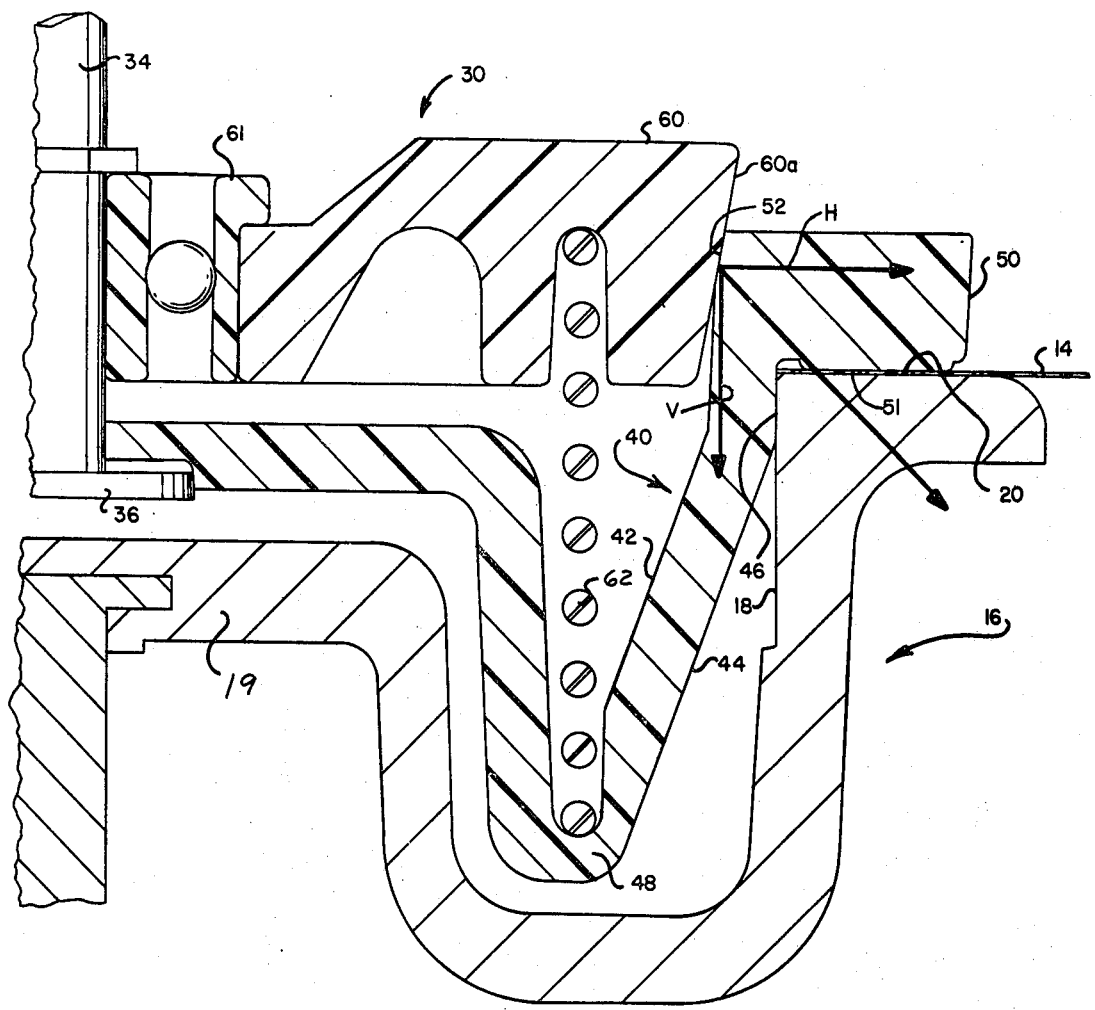
FIG.7
FIG.8
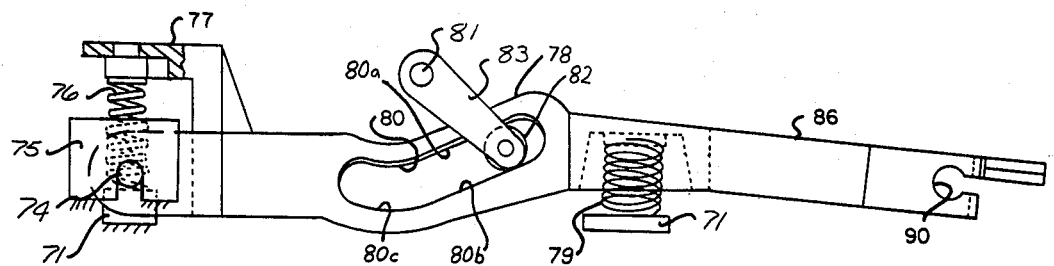

MECHANISM FOR CONTROLLING THE DISPLACEMENT OF A POSITIONER CONE RELATIVE TO A FLOPPY DISC

FIELD OF THE INVENTION

This invention relates generally to magnetic disc drives employing floppy discs and particularly to a mechanism for precisely centering and clamping a positioner cone onto the floppy disc.

BACKGROUND OF THE INVENTION

In systems using flexible media, specifically the so-called "floppy disc" systems, the media is confined within an envelope so that it can be stored, handled, mailed, and conveniently inserted into and removed from the floppy disc drive. The envelope has openings for different purposes, including a central opening exposing the central aperture of the compliant magnetic disc. The floppy disc drives are configured so that, when the disc is inserted into operative position, a member on one side of it can engage the central part of the disc against a rotatable spindle on the other, clamping the disc between the members and thus rotating the disc with the spindle, so that recording and reproduction can be accomplished.

In the earliest forms of floppy disc drives, as evidenced by Dalziel U.S. Pat. No. 3,678,481, the clamp and drive arrangement used a solid conical element to fit within the central aperture of the floppy disc. The conical element penetrated within a central concavity in the spindle, centering the disc concurrently with clamping, by moving the conical member into an engaged position. This arrangement was generally satisfactory for initial systems, in which relatively wide tracks (e.g. 12 mils) at relatively low track density (e.g. 48 tracks per inch) were utilized.

There has since been considerable attention directed toward improving the positioning and clamping structures for floppy disc mechanisms, as evidenced by U.S. Pat. Nos. 4,125,883 to Rolph, 4,208,682 to Bryer and 4,171,531 to Grapes et al, and the patents cited therein. As the art has evolved, the positioner cone, generally a plastic element, has been segmented radially into a number of petals or leaves, which are arranged to be somewhat resilient in order to be clamped down but substantially stiffer than the deformation characteristics of the floppy disc. There is a wide range of different approaches to the problem, as evidenced by the various patents, because the problem is not a simple one. The problems become more complex as the track widths become smaller (e.g. 4 to 6 mils) and the track density is doubled (e.g. 96 to 100 tpi). Under these conditions, expectable variations in the diametral size of the central aperture of the floppy disc, edge deformation on the floppy disc, and variations in the positioner cone itself, limit the degree to which eccentricity of the floppy disc about the central axis can be limited.

When a higher degree of precision is required in centering a floppy disc, other aspects also come into play. In most systems the positioner cone is mounted on the floppy disc cover, or on a pivotable support structure, so that as the cone is lowered down onto the disc and then engages the spindle it follows an arcuate path. Entry of the positioner cone into the central aperture of the floppy disc in this manner is undesirable, inasmuch as it can bend an edge of the aperture upon entry, or otherwise cause loss of precise centering.

The state of the art is evidenced by a structure disclosed in U.S. Pat. No. 4,139,876 to Owens in which the positioner cone is retained in a pivotable frame that can be moved downwardly to engage the positioner cone against a spindle. In practice the cone is segmented into relatively stiff petals, whose outline is smaller than the disc aperture. After the cone is seated on the spindle, clamping the floppy disc, a follower cone acts to spread the petals apart, attempting to urge them apart to attempt to center the floppy disc. The pivotal mounting of the positioner cone causes it to move into the aperture in the floppy disc along an arc, giving rise to the problems mentioned above.

SUMMARY OF THE INVENTION

In accordance with the invention precise centering of a floppy disc is substantially augmented by a pivotable support and loading mechanism for a positioner cone assembly. Straightline movement of the positioner cone along the central axis is achieved by mounting the cone and follower structure so as to pivot about a gimbal axis parallel to the plane of the floppy disc. The cone mechanism is supported at the free end of an assembly that is pivotally mounted in the drive at a region spaced apart from the central axis. A guide groove member, substantially parallel to the central axis, is engaged by a follower on the positioner mechanism within and slidable along the guide groove. The positioner cone is thus constrained both by the gimbal and the guide groove to enter into the central aperture of the floppy disc in a non-tilted attitude during the critical interval of movement.

The pivotable support and loading mechanism further comprises a central member having a curved guide slot and a cooperative engagement mechanism that provide a continuous movement of the positioner cone, followed by a secure clamping action. A crank arm rotated by a shaft controlled by an external lever is shifted between open and clamping positions, a control pin riding in the slot in the central member causing the pivotable assembly to translate up or down relative to the floppy disc and spindle. During downward movement the curved slot and cooperative pin first provide a continuous lowering action against a light spring that provides an opposite torque. When the assembly is lowered, the light spring is fully compressed and the pin rides into the overtravel region on the guide slot. At this point the crank arm and pin act to lower the pivot end of the assembly against a heavy spring that is aligned with the pivot axis. Pivot pins on the assembly are seated such that they permit a small downward movement adequate to compress the spring slightly and exert a spring force to clamp the disc and hold the control lever in stable position.

BRIEF DESCRIPTION OF THE DRAWINGS

A better understanding of the invention may be had by reference to the following description, taken in conjunction with the accompanying drawings, in which:

FIG. 7 is a side sectional view of the positioner cone assembly of FIG. 1, showing the operative relation thereto of a floppy disc; and FIG. 8 is a side view of a portion of the yoke loading mechanism of FIG. 1.

DETAILED DESCRIPTION OF THE INVENTION

Figure 1:
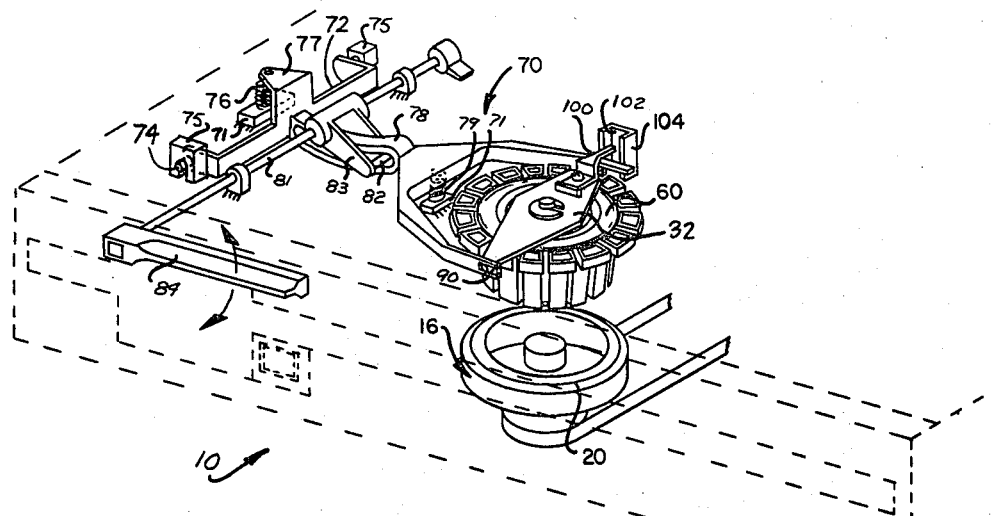
FIG. 1 is a simplified perspective view, partially broken away and partially in phantom, of a system assembly in accordance with the invention utilizing a positioner cone assembly and a yoke loading mechanism.

A floppy disc drive 10 in accordance with the invention, referring now to the drawings, is shown in which an envelope 12 (FIG. 6) containing a floppy disc 14 may be inserted via an entry slot into an approximately concentric operating position relative to the central axis of a center spindle 16. The center spindle 16, driven by a pulley 17 (FIG. 6), has a cup-shaped interior concavity 18 bounded by an upper annular rim surface 20 that defines the reference plane for the floppy disc and the engagement surface for rotating the floppy disc 14. A central, hollow boss 19 within the concavity is adapted to receive a bearing (not shown) to support the spindle thereby permitting the unit to have a low profile and compact configuration. Conventional means, such as a motor and a belt drive coupled to the shaft of the center spindle 16, are utilized to rotate the spindle and need not be described in detail. As is well known, and shown only generally in FIG. 6, the envelope 12 includes a central aperture 22 that is larger than the central aperture 24 of the floppy disc 14. Thus, a band of material about the central aperture 24 of the floppy disc is exposed to be engageable against the upper annular rim 20 of the center spindle 16.

In the present specification and claims, it is assumed for purposes of description and reference that the floppy disc will be mounted in the position shown, so that such reference terms such as "upper", "vertical" and "horizontal" will be utilized for convenience. It should be well recognized, however, that floppy disc drives are often mounted in other attitudes, as with the disc held in a vertical plane, and that the terms are to be taken in the sense in which the parts relate to each other.

A positioner cone mechanism 30 comprises a transverse support beam 32 from which depends a shaft 34 centered on the central axis and including an end flange or limit stop 36 at the end that is closest to the center spindle 16. A position cone 40 is mounted on the shaft 34, normally being in engagement with the limit stop 36. The positioner cone 40 includes multiple petals or leaves 42 extending from an integral cup-shaped and inverted body. There are sixteen petals in this example, and the cone 40 is made of a durable yet compliant plastic, such as "Norel", sold by the General Electric Company. This k2 a high friction but non-brittle material that can be molded precisely to shape. The petals 42 together define an exterior outline of precisely defined geometry. From the lowermost region of the cone 40 at the bottom of the cup-shaped body each petal 42 curves back upwardly to provide a diverging major surface 44 lying along the surface of a diverging cone. The bottom ring of the cone 40 defined by the petals 42 nests within the concavity 18 of the center spindle 16, about the boss 19, contributing to the low profile design. The diverging surface 44 merges at its upper region into an integral minor surface 46 forming a partial arc of a complete cylinder concentric with the central axis. The cone diameter at the minor surface 46 region is substantially greater than the nominal inner diameter of the central aperture 24 of the floppy disc 14. In this example the cylinder defined by the minor surfaces 46 is approximately 0.002" (0.051 mm) greater in diameter than the floppy disc central aperture 24. A range of 0.001" to 0.003" (0.025 mm to 0.076 mm) may be used for floppy discs of conventional types with this construction. The specifications for floppy discs provide a central aperture diameter of 1.500" (38.1 mm) with a small plus and minus tolerance, and for this combination the spindle is given a 1.5000" (38.1 mm) inside wall diameter with only a minus tolerance permitted.

The bottom of each petal 42 is joined to the inverted central cup, as best seen in the sectional view of FIG. 7, by a thin web section 48 to provide controlled compliance in movement of each petal 42 inwardly or outwardly relative to the central axis. The forces needed to deflect an individual petal 42 at its minor surface 46 are sufficiently low that the petals 42 deform upon initial contact of the tapered minor surface 46 with a disc edge rather than bending or buckling the floppy disc 14 itself.

At the upper end of each petal 42 is an outwardly protruding flange 50 having an undersurface 51 for bearing against the upper annular rim 20 of the center spindle 16. A right angle is thus formed by the cylindrical minor surface segment 46 and the adjoining undersurface 51 of the flange 50. The inside upper surface of each petal 42 also includes a bevel surface 52 which defines an arc portion of a conical surface when in nominal position.

A follower 60 in the form of a truncated cone having an outer surface 60a that converges in the direction toward the positioner cone 30 is also mounted on the rotatable shaft 34, above the positioner cone 40. A helical spring 62 about the shaft 34, between the lower surface of the follower 60 and the upper inside surface of the positioner cone 40 above the webs 48, biases the positioner cone 40 away from the follower 60, against the lower limit stop 36. This spring 62 has a greater spring force than that force needed to deflect the petals 42. The follower 60 is coupled to the shaft 34 by a bearing 61 and is held against upward movement on the shaft 34 by a retainer ring fitting within a circumferential groove in the shaft. The angle of convergence of the surface 60a of the follower cone 60 matches the conical surface defined by the bevels 52 on the upper inner rim of the petals 42 of the positioner cone 40.

The positioner cone mechanism 30 is supported in a pivotable yoke mechanism 70 mounted on a part of the disc drive frame 71 and having a pair of base arms 72 pivotting about outwardly extending pivot pins 74, as best seen in FIGS. 1, 2, 6 and 8. The pivot pins 74 seat (in low friction bushings not shown in detail) within seats 75 forming part of the frame and open on the underside thereof to permit some movement, as described below. A relatively heavy spring 76 in the plane of the pivot pins 74 is coupled between the frame 71 and the underside of an offset tab 77 coupled to the base arms 72. From the base arms 72 a slightly curved central member 78 on the yoke mechanism 70 extends along an axis substantially but not precisely parallel to the nominal plane of the floppy disc. The central member 78 has two spaced apart segments defining a guide slot 80 (best seen in FIG. 8) having side-accessible, curved guiding surfaces for a control pin 82 that extends transversely through the slot 80 in the member 78. A rotatable shaft 81 held in bearings (not shown in detail) mounted on the frame 71 transversely to the central member 78 supports a crank arm 83 coupled to the control pin 82. Shifting a control lever 84 (FIG. 1) on the front panel rotates the control pin 82 backward or forward on the crank arm 83 between limit positions relative to the guide slot 80. A relatively light spring 79 between the underside of the central member 78 and the frame 71 urges the yoke mechanism 70 away from the spindle 16. The guide slot 80 is curved to provide an overtravel or toggle-type action because it defines both a lifting arc and a locking arc, as is described hereafter.

The control pin 82 is rotated to its forward position by rotating the shaft 81 using the control lever 84. In this position it is spaced closer to the central axis of the floppy disc and the yoke mechanism 70 is pivoted away from the floppy disc 14. When the control pin 82 is moved toward its backward position along the surface 80b within the guide slot 80, the yoke mechanism 70 is pivoted downwardly against the force of the light spring 79. At the point 80c at which the guide slot 80 curvature changes angle, the positioner cone mechanism 30 has been moved into contact with the floppy disc 40 and the center spindle 16. This is the point at which an overtravel and toggle-type action is initiated. The light spring 79 is fully compressed when the overtravel movement begins as the crank arm 83 rotates the control pin 82 toward the pivot axis. As this occurs, the ramp angle changes, providing greater leverage from the force exerted on the control lever 84 (FIG. 1). Because the central member 78 is fully compressing the light spring 79, further movement of the member 78 requires some compression of the heavy spring 76 at the pivot end. The offset tab 77 extending from the base arms acts downwardly against the heavy spring 76, at the same time moving the pivot pin 74 slightly downward from the pin seats 75. Consequently, the yoke mechanism 70 exerts a springresponsive torque about the control pin 82 on the clamping mechanism. With the typical lever arms and moments for a system as shown in the drawings, a clamping force of about ten (10) pounds can be exerted without strain in actuating the control lever 84. The overtravel movement also ensures that the control lever 84 is stable in the loaded (disc operative) position. The force exerted by the heavy spring 76 can be adjusted by using a conventional tightening nut or other member (not shown in detail). Motion is controlled both by the springs 76 and 79 and the shape of the guide slot 80, so that the actions of centering and clamping are effected in one smooth continuous sequence.

The yoke mechanism 70 also controls the path of movement of the cone mechanism 30. Adjacent the free ends of a first arm 86 and a second arm 88 of the yoke mechanism 70, transverse apertures 90, 92 are provided that receive the end pins 93, 94 of the support beam 32 for the positioner cone assembly 30 and provide pivot bearing surfaces at the opposite ends. These pivot points, at 93 and 94, effectively gimbal-mount the positioner cone assembly 30 along a gimbal axis parallel to the plane of the inserted floppy disc. A groove follower tab 100 is mounted on one end of the support beam 32 to ride within a vertical guide groove 102 in an adjacent guide member 104. The follower tab 100 controls, together with the pivot points on the ends of the support beam 32, the attitude of the positioner cone mechanism 30 as it is moved upwardly and downwardly on the end of the pivotable yoke mechanism 70.

Figure 2:
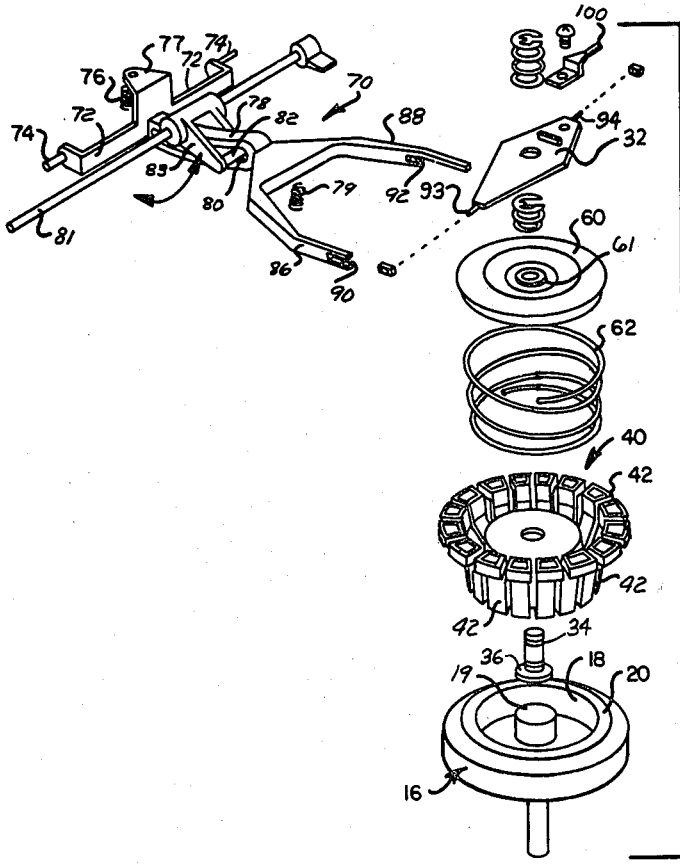
FIG. 2 is an exploded perspective view of the positioner cone assembly utilized in the arrangement of FIG. 1.
Figure 6:
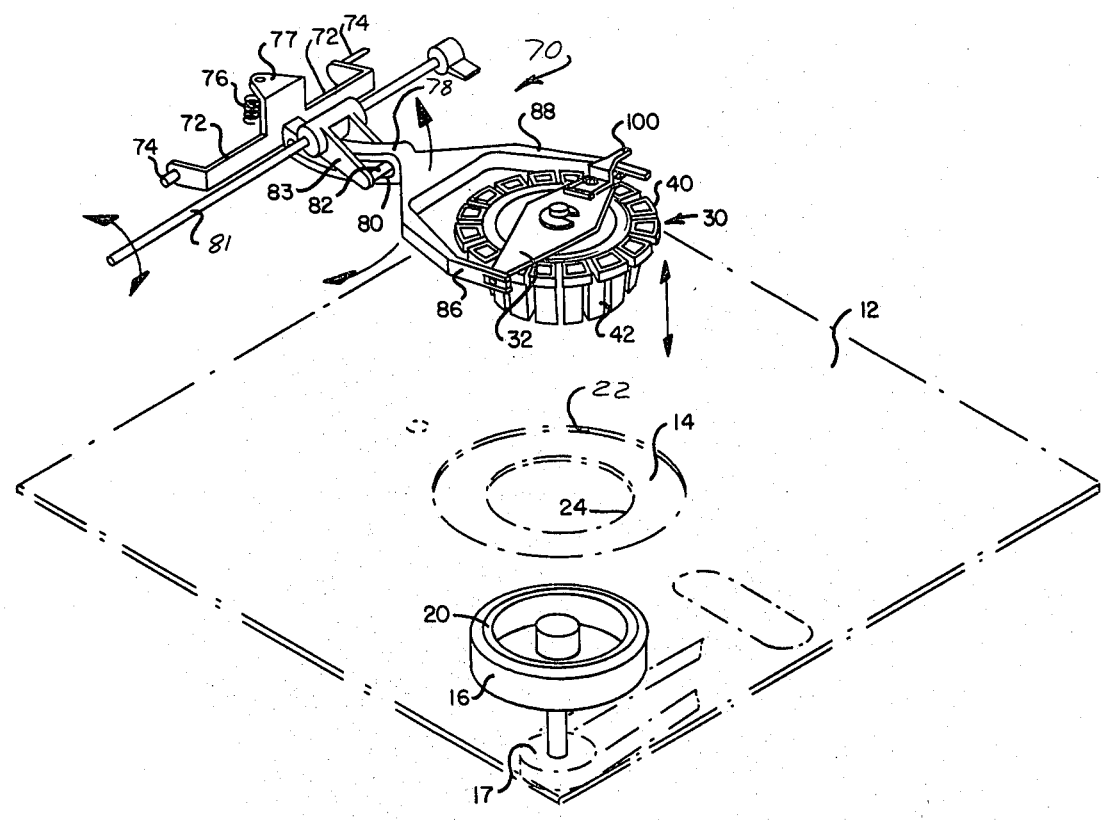
FIG. 6 is a simplified perspective view of the system of FIG. 1, showing the relationship of the elements to a floppy disc.

When the system is to be operated by inserting a floppy disc envelope 12, referring to FIGS. 1, 2 and 6 at the outset, the positioner cone mechanism 30 is held away from the envelope 12 for the floppy disc 14 by the yoke mechanism 70. An adequate spacing above the spindle 16 is available so the envelope 12 may be inserted through the entry slot to a limit position defined by side guides and limit stops (not shown in detail) in conventional fashion. For entry in this fashion, the control pin 82 is moved in the direction toward the central axis of the floppy disc 14 by rotating the control lever 84 at the entry side. After the envelope 12 is inserted the control lever 84 is turned down so that the control pin 82 is rotated backwardly to its opposite limit. This movement urges the positioner cone mechanism 30 downwardly, with the positioner cone 40 entering within the central aperture 24 of the floppy disc 14 in the continuous action previously described. Entry is made directly along the vertical axis because the positioner cone mechanism 30 is guided both by the bimbal pivots 93, 94 at the ends of the first and second arms 86, 88 and the slide follower 100 engaging the guide groove 102. In the critical region in which the diverging cone petals 42 begin to engage the central aperture 24 of the floppy disc 14, the attitude of the cone 40 is kept from tilting relative to the plane of the disc. Further, the cone 40 is kept concentric with the central axis. Irregular entry is thus avoided, and edge damage to the floppy disc 14 and wear of the plastic cone 40 are minimized. A more exact guiding system can be used for some applications, but the groove and follower arrangement shown has proven to be satisfactory in practical floppy disc systems for dual-sided 8" drives.

Figure 3:
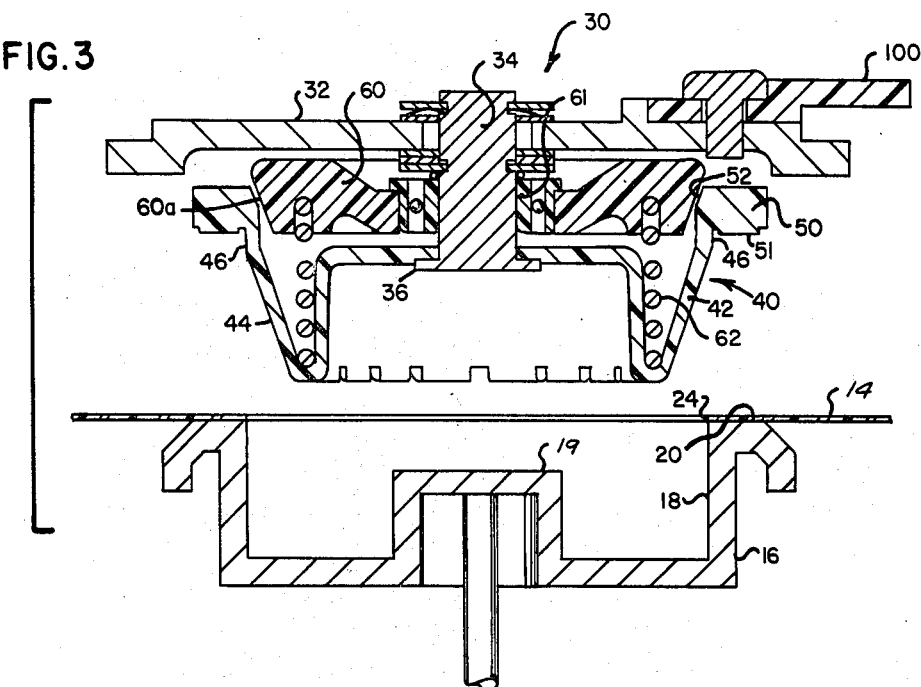
FIGS. 3, 4 and 5 are side sectional views of the positioner cone assembly, showing different positions relative to a floppy disc and a spindle mechanism during centering and clamping operation of the mechanism.
Figure 4:
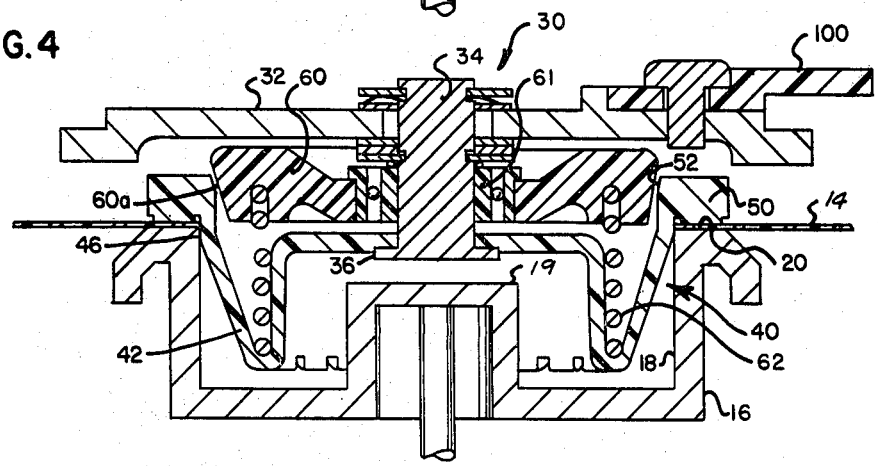
Figure 5:
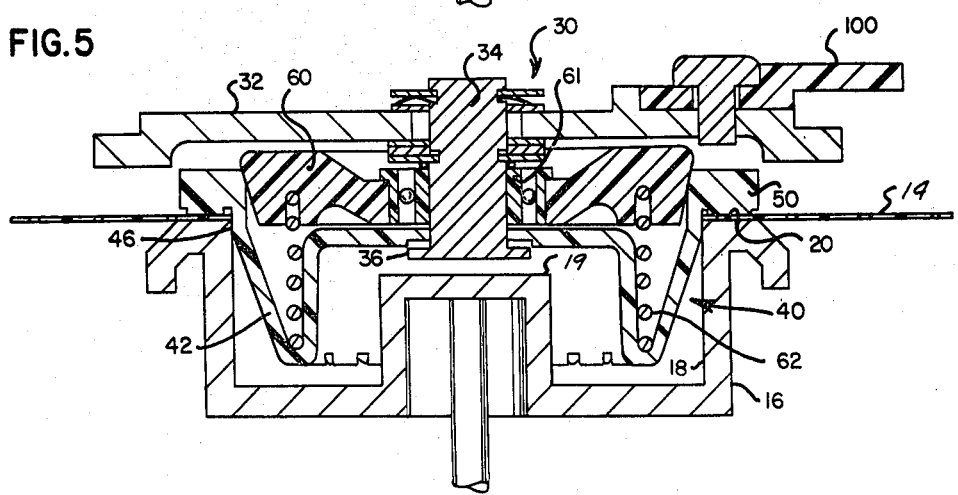

The manner in which the positioner cone mechanism 30 precisely centers and clamps the floppy disc 14 during the entry can be best understood by reference to the step sequence of FIGS. 3 to 5. The taper on the cone 40 is such that the tapered major surfaces 44 on the petals 42 assuredly enter within the central aperture 24 of the floppy disc 14, as long as the envelope 12 is not catastrophically misplaced when inserted. During initial downward movement of the mechanism 30 the follower 60 is held away from the beveled surfaces 52 at the upper inner edge of the positioner cone petals 42 by the helical spring 62. The cone 40 is maintained at its lower limit of movement, against the limit stop 36, as seen in FIG. 3. With further penetration of the cone 40 within the central aperture 24 and within the spindle concavity 18, the diverging tapered surface portions 44 of the petals 42 approach and contact the inner edge of the slightly smaller central aperture 24. The contact at any petal 42 is dependent upon the degree of eccentricity of the disc 14. In response, the petals 42, rather than the floppy disc 14, initially give way as the larger diameter cylinder defined by the petals 42 is compressed within the central aperture 24. However, as the downward movement proceeds and the petal diameters 42 increase, the most displaced petals 42 react against the unclamped disc 14 because of their resiliency, sliding it into concentric position as the bent petals seek to balance. The unclamped disc is of low mass and can readily be moved by these forces which act radially upon it. Concentricity is achieved by the time the vertical minor surfaces 46 near the cone 42 top enter the floppy disc 14, as seen in FIG. 4. The lower portion of the cone 40 at this point is within the spindle concavity 18, and compressed sufficiently by the disc 14 to enter without friction. As downward movement continues slightly further, the undersides 51 of the flanges 50 on the petals 42 contact the annular rim surface 20 of the center spindle 16. At this time, the cone 40 has reached a limit, and the follower 60 moves downwardly relative to the cone 40 and the bevel surfaces 52, against the helical spring 62. A short further movement downward of the follower 60 engages its tapered surface 60a against the surfaces 52 of the positioner cone 40, as shown in FIG. 5. The action concurrently clamps the undersurface 51 of the outward flanges 50 against the now positioned floppy disc 14, and against the upper annular rim surface 20 of the center spindle 16, while the cylindrical surface 46 is urged outwardly toward the inner wall of the spindle concavity 18. At the fully locked position of FIG. 5, the cone 40 is free of frictional engagement with the limit stop 36, which has moved a small distance downwardly along the central axis.

Engagement of the follower 60 against the petals 42 at the upper inside surfaces 52 has additional benefits because no distorting vertical or horizontal moments are induced in the petals 42. First, it should be noted that the petals 42 bend inwardly principally at the region of the thin webs 48, although the material is sufficiently light to be compliant in other regions as well. When the follower 60 exerts highest force against the petals 42, as seen in FIG. 7, there is minimal distortion because of the geometry used. The horizontal force vectors H act outwardly and the vertical force vectors V act downwardly around the secured and constrained outer flange 50 of the cone 40. Because these forces are centered on the bevel surfaces 52, there can be no imbalance or distortion of the cone.

This system provides reliable positioning and clamping of floppy discs in precise fashion without sensitivity to dimensional variations in the disc aperture. Cone wear, aging, and distortion are minimized, and high clamping forces are assured without any danger of disc damage. Much higher manufacturing yields are possible because the positioner cone dimensions are not as critical as in prior art systems. Using electronic measurement techniques for ascertaining track placement, it has been found that the discs are more accurately and repeatably placed, affording substantial potential for even higher track densities.

While various forms and variations have been described above, it should be appreciated that the invention is not limited thereto but encompasses all modifications and expedients falling within the scope of the appended claims.

What is claimed is:

1. A mechanism for controlling the lowering and clamping of a positioner cone device onto a floppy disc and associated spindle, comprising:
    a pivotable assembly having a free end coupled to support the positioner cone device in pivotable relationship relative to an axis perpendicular to the direction of lowering;
    guide means coupled to the positioner cone device for controlling the attitude of the device relative to the pivot axis during lowering; and
    means including overtravel means engaging the pivotable assembly and spring means coupled to the pivotable assembly for shifting the pivotable assembly when lowered against the floppy disc to act against the spring force and effect spring clamping of the positioner cone device against the floppy disc and spindle.

2. The invention as set forth in claim 1 above, wherein the pivotable assembly comprises a yoke mechanism having central member with an arcuate guide slot and a pair of yoke arms coupled to opposite sides of the positioner cone device, and wherein the means engaging the pivotable assembly comprises rotatable crank arm means including means engaging the guide slot in the central member.

3. The invention as set forth in claim 2 above, wherein the guide slot has two different curved regions, a first of which controls lowering of the pivotable assembly about the pivot axis and the second of which controls shifting of the pivot axis against the spring to cause the spring force to exert a clamping torque on the positioner cone device.

4. The invention as set forth in claim 3 above, wherein the pivotable assembly comprises a support beam pivotably coupled between the yoke arms and coupled to support the positioner cone device, the guide means comprises fixed means defining a substantially vertical guide groove, and groove follower means coupled to the support beam and engaging the guide groove, and the mechanism includes pivot pin means coupled to the pivotable assembly along a pivot axis and clamping spring means engaging the pivotable assembly in the plane of the pivot axis.

5. A mechanism for lowering a positioner cone device onto a floppy disc and associated spindle at a central axis and thereafter effecting secure clamping comprising:
    a pivotable assembly mounted about a pivot axis spaced apart from and perpendicular to the central axis, the free end of the pivotable assembly lowering or raising along the central axis as the assembly pivots and being coupled to support the positioner cone device, the pivotable assembly including an intermediate member having an arcuate guide surface and an offset member in fixed relation thereto in the plane of the pivot axis;
    spring means having one fixed end and an opposite end engaging the offset member; and
    control element means engaging the guide surface and movable therealong, the control element means and guide surface being arranged to pivot the assembly about the pivot axis in one region of the guide surface and act against the spring in another region of the guide surface.

6. The invention as set forth in claim 5 above, wherein the guide surface comprises a guide along curved in the plane of movement of the assembly, and the control element means comprises pin means engaging the guide slot and crank arm means coupled to the pin means and pivotable about a crank arm axis parallel to the pivot axis.

7. The invention as set forth in claim 6 above, wherein the guide slot has two different curvatures at different spacings from the pivot axis, a first for raising and lowering of the pivotable assembly and a second for controlling clamping of the positioner cone device, and wherein the two curvatures merge at an overtravel region.

8. The invention as set forth in claim 7 above, wherein the first curvature is at greater radial spacing from the pivot axis than the second aperture and wherein the crank arm axis is above the intermediate member.

9. The invention as set forth in claim 8 above, wherein the pivotable assembly comprises pivot means that are movable against the spring means, and wherein the force exerted on the intermediate member by the pin means when in engagement with the second curvature of the guide slot causes the offset member to act against the spring means and tend to shift the pivot means and compress the spring means.

10. A system for centering and clamping a floppy disc having a central aperture that is to be rotated about a central axis, comprising:
   means including a rotatable central spindle having a terminal annular surface concentric with the central axis for providing a reference surface against which the floppy disc may be engaged and driven;
   positioner cone means disposed adjacent the annular surface and concentric with the central axis, the positioner cone means being rotatable about the central axis and having a conical side surface converging at an inert end receivable within the annular surface, the positioner cone means having multiple petal segments having an outer flange for engaging the annular surface;
   means coupled to the positioner cone means and rotatable therewith for engaging the petal segments against the central spindle to clamp the floppy disc; and
   loading arm means including gimbal means coupled to control and guide the positioner cone means so as to maintain parallelism with the central axis during insertion into the floppy disc.

11. The invention as set forth in claim 10 above, wherein the last-mentioned means comprises a yoke mechanism mounted to pviot about an axis spaced apart from the central axis, and a pair of yoke arms extending on opposite sides of the positioner cone means, the system also including gimbal means coupling the positioner cone means to the pair of yoke arms for providing a gimbal pivot axis parallel to the plane of the floppy disc, guide means positioned adjacent the positioner cone means, and follower means coupling the guide means to the positioner cone means to control the attitude of the positioner cone means relative to the gimbal axis.

12. A support and clamping control system for a positioning and clamping cone mechanism to be engaged against a center spindle in a floppy disc drive system comprising:
   a pivotable yoke mechanism mounted to pivot about an axis that is spaced apart from the central axis of the floppy disc drive and including a pair of arms having spacedapart ends at the opposite end from the pivot axis;
   gimbal means coupling the cone mechanism to the pair of arms such that the cone mechanism can pivot about an axis that is perpendicular to the central axis and parallel to the plane of the floppy disc; and
   means coupled to the yoke mechanism and the cone mechanism for controlling the attitude of the cone mechanism about the gimbal axis during movement toward and away from the center spindle to maintain the cone mechanism in non-tilted relation to the floppy disc.

13. The invention as set forth in claim 12 above, wherein the yoke mechanism further includes means defining a guide slot spaced apart from the pivot axis and the system includes means engaging the guide slot for maintaining the cone mechanism in parallelism to the central axis.

14. A mechanism for controlling the lowering and clamping of a positioner cone on a floppy disc and associated spindle, comprising:
   a transverse support positioned above the spindle and movable toward and away from the spindle, the positioner cone being carried by the transverse support;
   a pivotable assembly having a free end coupled to the transverse support to lower the support, the pivotable assembly including a guide slot;
   a rotatable shaft having a control lever at one end and a crank arm at the other end;
   a control pin extending from the crank arm into the guide slot, the control lever being adapted to rotate the rotatable shaft and move the control pin through an arc to lower the transverse support, the control pin being movable to an overtravel, toggle position in the guide slot to effect clamping of the floppy disc between the positioner cone and the spindle.

15. The mechanism defined in claim 14, in which:
   the transverse support is operatively associated with means for controlling the attitude of the positioner cone as it is lowered.

* * * * *